United States Patent
Gross et al.

(10) Patent No.: US 12,162,693 B2
(45) Date of Patent: Dec. 10, 2024

(54) LINEAR MOTOR SYSTEM

(71) Applicant: Schneider Electric Industries SAS, Rueil-Malmaison (FR)

(72) Inventors: André Gross, Wuerzburg (DE); Volker Muellerschoen, Hoechberg (DE); Stefan Ohnemus, Schuttertal (DE); Andreas Rothaug, Esselbach (DE); Achim Waldschmitt, Moenchberg (DE); Jens Bunsendal, Wuerzburg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/656,656

(22) Filed: Mar. 28, 2022

(65) Prior Publication Data
US 2022/0315345 A1    Oct. 6, 2022

(30) Foreign Application Priority Data

Mar. 31, 2021    (EP) .................................... 21305413

(51) Int. Cl.
*B65G 23/23*    (2006.01)
*B65G 17/12*    (2006.01)

(52) U.S. Cl.
CPC .............. *B65G 23/23* (2013.01); *B65G 17/12* (2013.01)

(58) Field of Classification Search
CPC ........ B65G 23/23; B65G 17/12; B65G 54/02; H02K 41/031; H02K 41/0356; H02K 1/06; H02K 5/04
See application file for complete search history.

(56) References Cited

U.S. PATENT DOCUMENTS

| | | | |
|---|---|---|---|
| 9,365,354 B2 * | 6/2016 | Takagi | .................... H02P 25/06 |
| 2014/0257554 A1 | 9/2014 | Takagi | |
| 2020/0048006 A1 * | 2/2020 | Neufeld | ................. B65G 39/09 |

FOREIGN PATENT DOCUMENTS

| | | | | |
|---|---|---|---|---|
| NL | 8401073 A | * | 11/1985 | ............. B60L 13/03 |
| WO | WO-2013143783 A1 | * | 10/2013 | ............. B65G 54/02 |
| WO | WO-2013143950 A2 | * | 10/2013 | ............. B65G 54/02 |
| WO | WO-2017042273 A1 | * | 3/2017 | ............. H01F 6/006 |
| WO | WO-2017149066 A1 | * | 9/2017 | ......... B66B 11/0407 |
| WO | WO-2020078602 A1 | * | 4/2020 | |

OTHER PUBLICATIONS

European Office Action issued Sep. 30, 2021, in European Patent Application No. 21305413.3, 10 pages.

* cited by examiner

*Primary Examiner* — Gene O Crawford
*Assistant Examiner* — Abby A Jorgensen
(74) *Attorney, Agent, or Firm* — Oblon, McClelland, Maier & Neustadt, L.L.P.

(57) ABSTRACT

A linear motor system, in particular a transport system, having a carrier, having a guide track for the carrier, having a guide rail arranged at the guide track, and having a guide element arranged at the carrier, wherein the guide rail and the guide element cooperate to guide the carrier at the guide track, a magnet is provided at the carrier and a magnet is provided at the guide track for driving the carrier along the guide track and/or for holding the carrier at the guide track, a y direction extends in parallel with a spacing between the magnets, the guide track comprises a contact surface which the guide rail contacts, and a normal of the contact surface extends with at least one component in parallel with the y direction.

14 Claims, 5 Drawing Sheets

LINEAR MOTOR SYSTEM

The present invention relates to a linear motor system, in particular a transport system, e.g. a multicarrier, having at least one carrier, having a guide track for the carrier, having a guide rail arranged at the guide track, and having a guide element arranged at the carrier, wherein the guide rail and the guide element cooperate to guide the carrier at the guide track, wherein a magnet is provided at the carrier and a magnet is provided at the guide track for driving the carrier along the guide track and/or for holding the carrier at the guide track.

Linear motors are widely used today. They can be used to move, in particular to transport, products in industrial plants, for example. Multi-carriers are particularly advantageous for the flexible transport of the most varied products. They in particular comprise a plurality of carriers, that is transport units, that are movable individually and independently of one another. In a typical multi-carrier system, the guide track is closed in itself, i.e. practically endless, which enables a revolving operation. However, "open" systems, i.e. systems without a revolving operation and with defined track ends, also exist, for example.

In a known linear motor system of the initially mentioned kind, guide rails are fastened to the guide track from above or from below. Such a fastening can e.g. be seen in FIG. 3 that will be described in more detail in the following. There, the respective guide rail contacts a contact surface of the guide track, wherein the normal of the contact surface faces downwardly or upwardly. In the coordinate system drawn in FIG. 3, the normal extends perpendicular to the y direction and in parallel with the z direction. The guide rail is fastened to the guide track in a fastening direction in parallel with a z direction. In this respect, an alignment of the guide rail in the y direction is typically necessary so that the spacing between the magnets of the carrier and the magnets of the guide track corresponds to a predefined value. This alignment, for example, takes place by cylindrical pins that are likewise inserted in the z direction.

It is an object of the invention to simplify the assembly and/or dismantling of the guide rail at or from the guide track in a linear motor system of the initially mentioned kind. It is a further object of the invention to simplify the maintenance of a linear motor system of the initially mentioned kind.

These objects are satisfied by a linear motor system in accordance with claim 1, in particular in that a normal of the contact surface of the guide track which the guide rail contacts extends with at least one component in parallel with the y direction or in parallel with a spacing between the magnets.

Due to this alignment of the contact surface which the guide rail contacts, an alignment in the y direction is so-to-say automatically provided. In particular, no additional alignment of the guide rail with respect to the y direction, for instance by cylindrical pins, is necessary. This facilitates the assembly and dismantling of the guide rail as well as the maintenance of the linear motor system. The contact surface can therefore define the position of the carrier in the y direction. An alignment of the guide rail in the z direction is possibly not even necessary, depending on the design of the carrier.

The alignment by the contact surface furthermore has the advantage that a tolerance chain is short with respect to the y positioning of the carrier magnet relative to the guide track and with respect to the spacing between the magnets. The predefined spacing of the magnets from one another can thus be particularly precisely observed in a simple manner.

The y direction is defined as parallel to the spacing between the magnets in accordance with the claim. An attractive force between the magnets can in particular likewise be effective in parallel with the y direction or with the spacing. In this respect, the attractive force in particular acts such that a force is exerted against the contact surface, which the guide rail contacts, by the attractive force via the carrier and via the guide rail.

The normal of the contact surface extends with at least one component in parallel with the y direction. This means that a y component of the normal is greater than zero. The contact surface can thus, for example, extend obliquely with respect to the y direction or preferably at least substantially perpendicular to the y direction. A slanted contact surface also generally assists an alignment of the guide rail in the y direction.

The contact surface can preferably be planar. In general, the contact surface does not have to be planar, however. For example, the contact surface can comprise a V-shaped groove, whereby an automatic alignment of the guide rail in a direction perpendicular to the y direction, typically in the z direction, can be achieved, for example.

The guide rail can preferably be fastened to an outer surface of the guide rail that faces the carrier and/or the carrier magnet. Such an outer surface can also be designated as the "front side" of the guide track since it often faces an operator or a product to be moved during operation. The outer surface can be formed by the contact surface.

The guide rail can, for example, be arranged in the y direction between the contact surface and an associated guide element of the carrier. The guide rail can preferably be arranged solely on a side of the contact surface of the guide track facing the guide element.

The guide rail is generally a separate component that can in particular be releasably fastened to an element or a component of the guide track, for example, by a screw connection.

In general, a z direction can, for example, be defined perpendicular to the y direction. An x direction can be defined perpendicular to the y direction and perpendicular to the z direction. The x direction can preferably correspond to a guide direction, along which the carrier is movable in a guided manner, or can extend in parallel therewith.

A guide rail is generally effective in a limiting manner with respect to the y direction in cooperation with the guide element. In addition, a guide rail can be effective in a limiting manner with respect to the z direction in cooperation with the guide element. However, the guide rail is preferably not effective in a limiting manner in the x direction in cooperation with the guide element. For example, a plurality of guide rails and corresponding guide elements can be provided. A corresponding number of contact surfaces for the guide rails are preferably provided at the guide track. In a preferred embodiment, two guide rails are provided. This in particular relates to a given cross-section in the yz plane. The two guide rails can preferably extend at two sides of the magnet of the guide track, e.g. above and below in the z direction. Irrespective of the number of guide rails with respect to the cross-section in the yz plane, a respective guide rail can generally also comprise a plurality of guide rail sections, as will be explained in more detail in the following.

In a preferred embodiment, a y component of the normal of the contact surface is greater than components of a normal in directions perpendicular to the y direction. In other words:

The normal preferably extends mainly in the y direction. This improves the alignment function of the contact surface. Insofar as it is mentioned herein that an axis or a direction extends with at least one component in the y direction, this paragraph applies accordingly, i.e. provision can also be made that the axis or direction extends mainly in the y direction.

It is particularly preferred if the normal of the contact surface is at least substantially in parallel with the y direction. This further improves the alignment function of the contact surface. Insofar as it is mentioned herein that an axis or a direction extends with at least one component in the y direction, this paragraph applies accordingly, i.e. provision can also be made that the axis or direction extends at least substantially in parallel with the y direction.

In accordance with an advantageous further development, provision is made that the guide rail is fastened against the contact surface. This allows a simple assembly and dismantling of the guide rail.

Provision can advantageously be made that the guide rail is fastened to the guide track in a fastening direction, wherein the fastening direction is at least substantially in parallel with the y direction. The fastening can thus preferably take place "from the front". This allows a simple assembly and dismantling of the guide rail.

In an embodiment, a fastening device for the guide rail is provided, wherein the fastening device exerts a fastening force with a component in the y direction, in particular at least substantially in parallel with the y direction.

The guide rail can e.g. be fastened to a component of the guide track, in particular against the contact surface, by means of one or preferably more fastening elements, e.g. screws, and/or fastening recesses, e.g. threads.

For example, provision can be made that the guide rail is fastened to the guide track by means of a fastening element, in particular a screw, that is effective with a component in the y direction, in particular at least substantially in parallel with the y direction, and/or that is inserted and/or engages with a component in the y direction, in particular at least substantially in parallel with the y direction, into a fastening recess that in particular has an internal thread.

A fastening recess, e.g. having an internal thread for a screw, can preferably be formed in the contact surface of the guide track.

However, it is alternatively or additionally also possible that a fastening recess is formed by a separate element. Thus, a screw together with a nut and/or a slot nut can, for instance, effect a fastening of the guide rail. In the case of the slot nut, the guide track preferably comprises a groove for fastening by means of a screw and a slot nut. The groove can preferably be formed in the contact surface.

In accordance with an advantageous embodiment, the guide track comprises a plurality of segments. The segments allow a flexible shaping for the linear motor system. The linear motor can e.g. essentially be formed as long as desired by simply using any desired number of segments for designing the guide track. Segments can e.g. be provided in standardized form so that the segments can be manufactured cost-effectively, but an individual design of the linear motor system is nevertheless guaranteed. Furthermore, the segmented design simplifies the maintenance of the linear motor system since only the respective segment has to be replaced or dismantled for repair in the event of a fault.

A respective segment typically comprises a set of electromagnets for driving the carrier and preferably comprises power electronics for the electromagnets. A segment can thus in particular form or comprise a linear motor.

A segment can e.g. also comprise a set of position sensors, e.g. magnetic sensors, for determining the position of the carrier.

In a further development, provision is made that the guide rail or a guide rail section extends over a plurality of segments. The guide rail generally extends along the guide direction that typically forms the x direction. The further development simplifies the maintenance of the linear motor system. Thus, the guide rail can in particular remain fastened to at least a first segment while it is released from a second segment for the purpose of the maintenance of said second segment. This proves to be particularly advantageous for a long guide rail that extends over a plurality of segments.

In general, a guide rail is preferably fastened to a plurality of or all the segments of the guide track over which the guide rail extends. Advantageously, a plurality of or all the segments have a contact surface for the guide rail against which the guide rail can be fastened. The same applies to a guide rail section.

A guide rail section is ultimately a type of segment of the guide rail, but is designated as a section for the sake of a clear separation of terms. The guide rail can comprise a plurality of sections that are designed as separate components and that are typically arranged behind one another in the guide direction. This is in particular advantageous when the linear motor system comprises a curve guide region and a straight guide region. For separate guide rail sections can then be manufactured separately from one another in accordance with the demands in the different regions. Furthermore, it is generally advantageous if guide rail sections are as long as possible in relation to the total guide track or (in other words) if there are as few transitions as possible between guide rail sections since transitions cause noise and wear when traveled over by guide elements. In this regard, it is therefore ultimately also advantageous if a guide rail section—at a given number and length of the segments of the guide track—extends across as many segments as possible. However, in designs of the prior art in which the guide rail is fastened in a fastening direction in parallel with the z direction, this proves to be disadvantageous in the maintenance since the segments are not accessible or cannot be removed in the z direction without having to dismantle the guide rail. It is understood that the dismantling of a guide rail that is as long as possible tends to be complex and/or expensive. Furthermore, the re-alignment of the guide rail usually also takes place in the prior art. The present teaching, in contrast, in particular allows segments to be able to be individually removed in the z direction despite the assembled guide rail. Only a release of fastening elements—in particular in the y direction—that fasten the guide rail to the respective segment is typically necessary. However, the guide rail can remain fastened to adjacent or further segments. Thus, the guide rail also does not have to be realigned after an insertion of a new or maintained segment.

A z direction can e.g. be defined perpendicular to the y direction. An embodiment provides that, when the guide rail is fastened, an element of the guide track to which the guide rail is fastened and/or a segment of the guide track is/are accessible and/or removable at least substantially in parallel with the z direction. This facilitates the maintenance of the guide track. The element or the segment, including the magnet, can in particular be removable from the guide track.

The guide track or a segment typically comprises an element that defines the position of the guide rail relative to the position of the magnet of the guide track. Both the guide rail and the magnet of the guide track are typically fastened to this element. The element can generally be formed in multiple parts, with the plurality of parts, however, being fixedly connected to one another to define the relative position. The element can surround the magnet of the guide track at least at one side, preferably at both sides, e.g. in a direction perpendicular to the y direction or in parallel with the z direction.

In a further development, provision is made that the guide track, in particular a respective segment of the guide track, comprises an electronics housing. Electronic components for operating the linear motor system, in particular circuit boards and/or power electronics for the driving of the carrier via the magnets of the guide track, can e.g. be arranged in the electronics housing.

In a further embodiment, provision is made that the guide rail leaves free and/or does not bound the component to which it is fastened, in particular the segment and/or the element, in at least one direction in parallel with the z direction. It is hereby made possible in a simple manner that the component, segment, or element can be removed in the z direction without having to completely assemble the guide rail. The guide rail is preferably only located outside the projection of the component, the segment, and/or the element in parallel with the z direction. The guide rail can preferably leave free and/or not bound the component, segment, or element in two directions in parallel with the z direction. Thus, the component, element, or segment can be removed both upwardly and downwardly—in the case of a vertical z direction.

The guide rail can, for example, comprise a contact surface for contact with the contact surface of the guide track and a guide surface for bringing the guide element of a carrier in contact with the guide rail.

In an embodiment, provision is made that the contact surface of the guide rail and the guide surface are connected in one piece with one another. This allows a simple manufacture and a precise alignment of the guided guide element.

An alternative embodiment provides that the contact surface of the guide rail and the guide surface are formed by separate components. The guide surface can hereby be more easily designed as required. Thus, a material can, for example, be used for the guide surface that causes little wear in the guide system. Different materials can preferably, for example, also be used for the guide surface and the contact surface of the guide rail. This allows a design that particularly meets the requirements.

In general, a guide rail can preferably comprise aluminum as a material. If the guide surface is formed from a different material than the contact surface of the guide rail, the contact surface of the guide rail can preferably be formed from aluminum. A guide rail or a component of the guide rail composed of aluminum can, for example, be manufactured in a simple manner by extrusion.

The magnet of the carrier can e.g. be attracted to the magnets of the guide track at least substantially in parallel with the y direction. The carrier can in particular be held at the guide track in this manner.

The magnet of the carrier can, for example, be configured as a permanent magnet. The carrier can, for example, also comprise a plurality of magnets, e.g. permanent magnets. The plurality of magnets can each be configured as a holding magnet and/or a drive magnet. The plurality of magnets can, for example, also together form a magnet unit and/or a set of magnets.

In general, the carrier and/or the guide track can preferably have a plurality of magnets for driving a carrier along the guide track and/or for holding a carrier at the guide track.

At the guide track, a plurality of magnets are preferably arranged distributed along the guide track. A segment can, for example, also have a plurality of magnets. The number of magnets in particular results in dependence on the length of the guide track or of the segment. The guide track preferably comprises a series of magnets that extend along the guide direction or in the x direction.

The at least one magnet of the guide track or of the segment can in particular be an electromagnet. Said electromagnet can e.g. also comprise a permanent magnet, e.g. for holding the carrier at the guide track, in particular in a de-energized state. However, a permanent magnet can generally also be provided separately from the electromagnet.

With further advantage, the linear motor system can, for example, comprise a plurality of carriers that can in particular be moved independently of one another.

The carrier comprises at least one guide element. Said guide element can preferably be designed as a guide roller.

The objects of the invention are also satisfied by a method in accordance with the claim directed thereto. The method serves for the assembly, dismantling, or maintenance of a linear motor system in accordance with the kind described above, wherein the method comprises the steps: releasing the guide rail from the guide track in a direction with a component in the y direction, in particular at least substantially in parallel with they direction, and/or fastening the guide rail to the guide track in a fastening direction with a component in the y direction, in particular at least substantially in parallel with the y direction.

The release preferably takes place from the contact surface. The fastening preferably takes place against the contact surface.

The guide track can, for example, comprise a plurality of segments. The method can preferably comprise at least one of the steps: removing a segment in a direction extending at least substantially perpendicular to the y direction, in particular a z direction, and/or inserting a segment in a direction extending at least substantially perpendicular to the y direction, in particular a z direction. The removal of the segment and/or the insertion of the segment preferably takes/take place after the release of the guide rail. The insertion of a segment preferably takes place after the removal of the segment.

The guide rail can advantageously remain fastened to at least one further segment, preferably to a plurality of further segments, during the removal and/or the insertion of the segment.

It is understood that the methods described herein can also be further developed in the sense of the individual features and embodiments described with respect to the apparatus, that is in particular the linear motor system, the transport system, and/or the carrier. This also applies in reverse and between different methods and apparatus.

The invention will be explained only by way of example in the following with reference to the schematic drawings.

Figure 1:
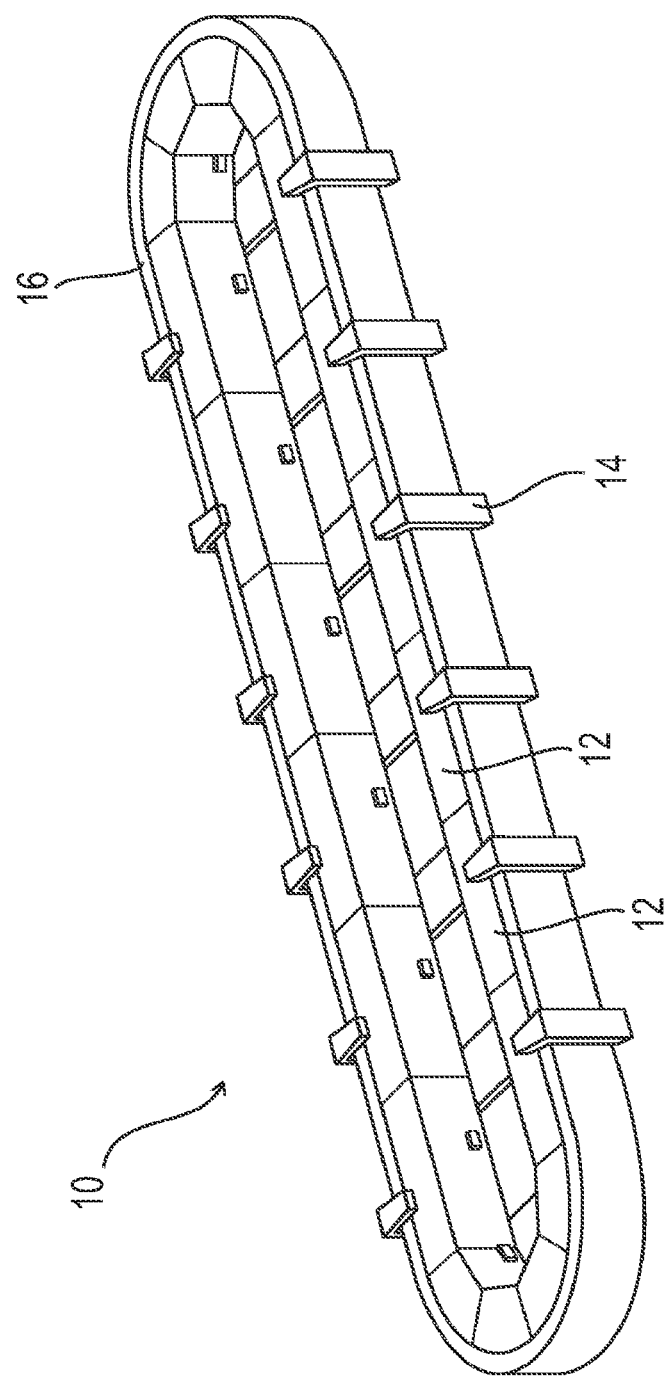
FIG. 1 shows a linear motor system of the prior art configured as a transport system.

A transport system 10, which is configured as a multi-carrier system, is shown in FIG. 1. The transport system 10 comprises a plurality of segments 12 which are configured as linear motors, which are arranged in a row, and of which only two are referenced here for reasons of clarity. The transport system 10 furthermore comprises a plurality of carriers 14. The segments 12 together form a guide track 16 along which the carriers 14 are movable in a guided manner, in particular independently of one another.

Figure 2:
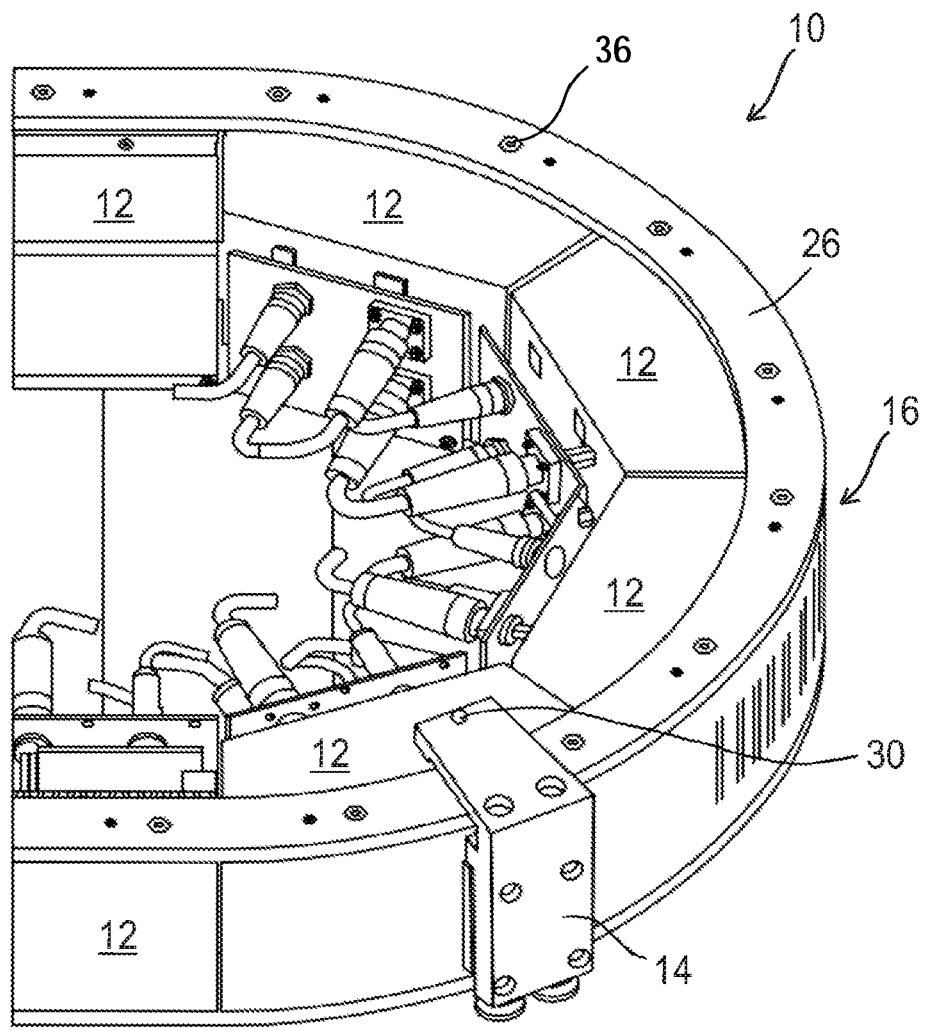
FIG. 2 shows a curve section of the transport system of FIG. 1.

FIG. 2 shows a curve section of the transport system 10 in an enlarged view. Only one of the plurality of carriers 14 shown in FIG. 1 is shown here. The carrier 14 is movable along the guide track 16, namely via the linear motors of the segments 12. Different electronic devices, in particular terminals, for controlling the linear motors are visible at the side of the guide track 16 remote from the carrier 14, i.e. within the curve.

Figure 3:
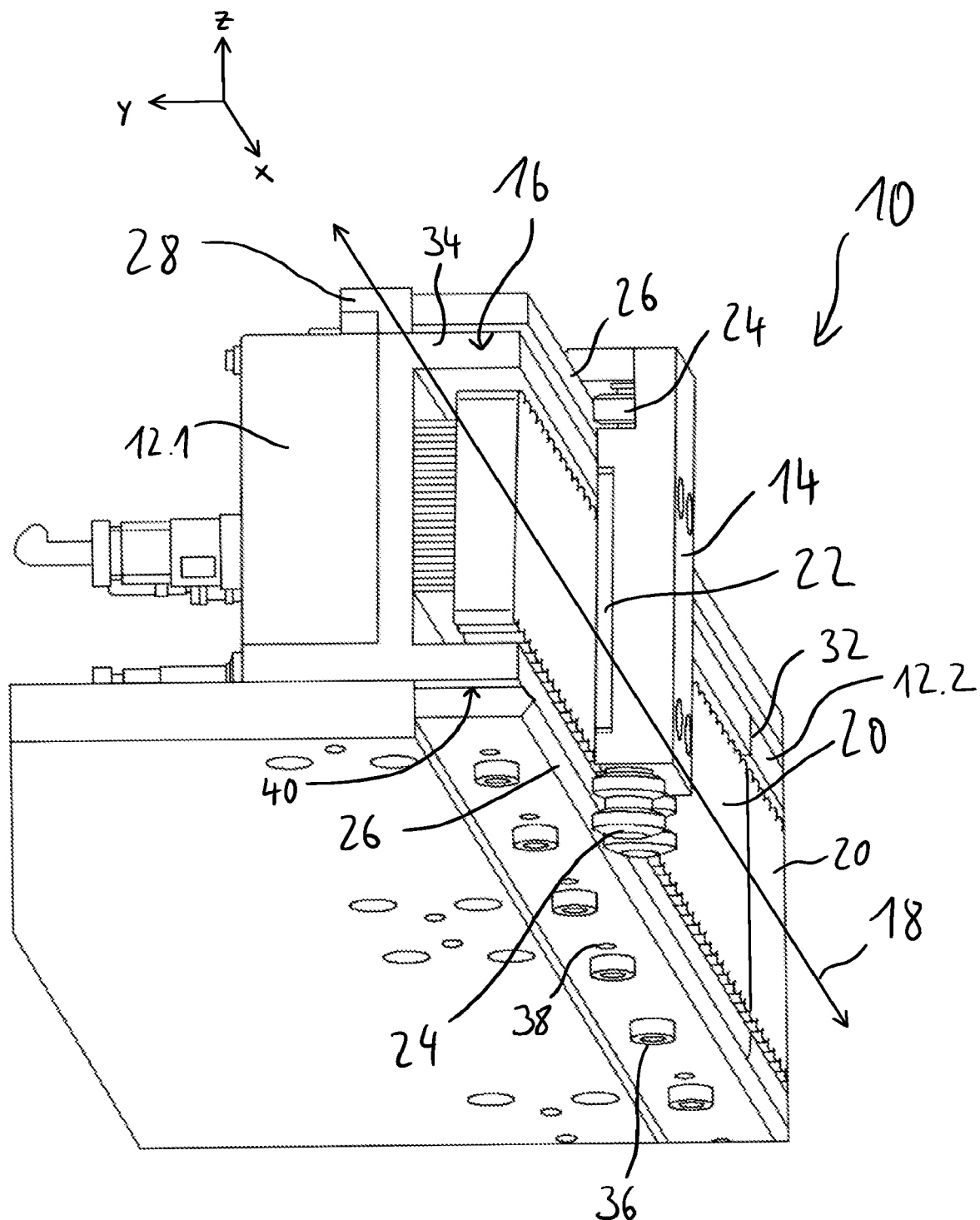
FIG. 3 shows a sectioned perspective representation of the transport system of FIG. 1 with the sectional plane perpendicular to a guide track.

The transport system 10 is shown sectioned and enlarged in FIG. 3. A carrier 14 is visible that is movably guided at the guide track 16. In this respect, the carrier 14 is movable along a guide axis 18 or a movement axis. For a movement along the guide axis 18, the carrier 14 is controlled by a plurality of electromagnets 20 that are arranged at the guide track 16 and uniformly distributed along it. The electromagnets 20 in so doing cooperate with a permanent magnet 22, which is arranged at the carrier 14 and which can also be designated as a drive magnet, for driving the carrier 14 along the guide axis 18.

The carrier 14 is mechanically guided at the guide track 16, in this instance by a roller guide. The carrier 14 comprises guide elements 24 that are configured as guide rollers. The guide track 16 comprises guide rails 26. In this respect, the carrier 14 is in particular held at the guide track 16 via the permanent magnet 22. The transport system 10 furthermore comprises a position detection device 28. Said position detection device 28 can, for example, be formed as a series of a plurality of magnetic sensors that extend along the guide track 16. A permanent magnet 30, which can also be designated as a position magnet and which is visible in FIG. 2, can be provided at the carrier 14, for example.

The transport system 10 further comprises a control device that is not shown separately and that is configured to control the electromagnets 20 in a targeted manner in order to move the carrier 14 along the guide track 16 or the guide axis 18. In this respect, the position detection device 28 returns position information relating to the position of the carrier 14 with respect to the guide axis 18 to the control device. The control device regulates the movement of the carrier 14 on the basis of the position information.

A coordinate system having x, y, and z directions is drawn in FIG. 3. The x direction extends in parallel with the guide axis 18. They direction extends perpendicular to the x direction and in parallel with a spacing between the magnets 20 and 22 and in parallel with the direction in which the permanent magnet 22 is attracted to the electromagnets 20. The z direction extends perpendicular to the x direction and the y direction.

A segment 12.1 of the guide track 16 is shown sectioned in FIG. 3. The section plane is disposed in the yz plane. A second segment 12.2 that contacts an abutment edge 32 at the first segment 12.1 is furthermore partly visible.

The guide rails 26 are fastened to an element 34 of the respective segment 12. A plurality of screws 36 by means of which the guide rail 26 is fastened to the element 34 are visible at the guide rail that is the lower guide rail 26 in FIG. 3.

Since the spacing of the magnets 20 and 22 from one another or the position of the carrier 14 in the y direction should correspond as closely as possible to a predefined value, the guide rail has to be aligned with respect to the y direction. This, for example, takes place via cylindrical pins for which a plurality of recesses 38 are indicated here.

The guide rail that is the lower guide rail 26 in FIG. 3 is fastened against a contact surface 40 of the respective segment 12 that extends perpendicular to the z direction, i.e. whose normal extends in parallel with the z direction—unlike in the linear motor system in accordance with the invention.

The guide rail that is the upper guide rail 26 in FIG. 3 is fastened in a similar manner to the element 34. Corresponding screws 36 are indicated in FIG. 2.

As can likewise be seen from FIG. 3, the guide rails 26 extend across a plurality of segments 12, namely at least over the segments 12.1 and 12.2. If a segment 12 is to be dismantled for the purpose of maintenance, at least one of the two guide rails 26 has to be completely dismantled beforehand to be able to remove the respective segment 12 in the z direction from the series of segments 12 or from the guide track 16.

Figure 4:
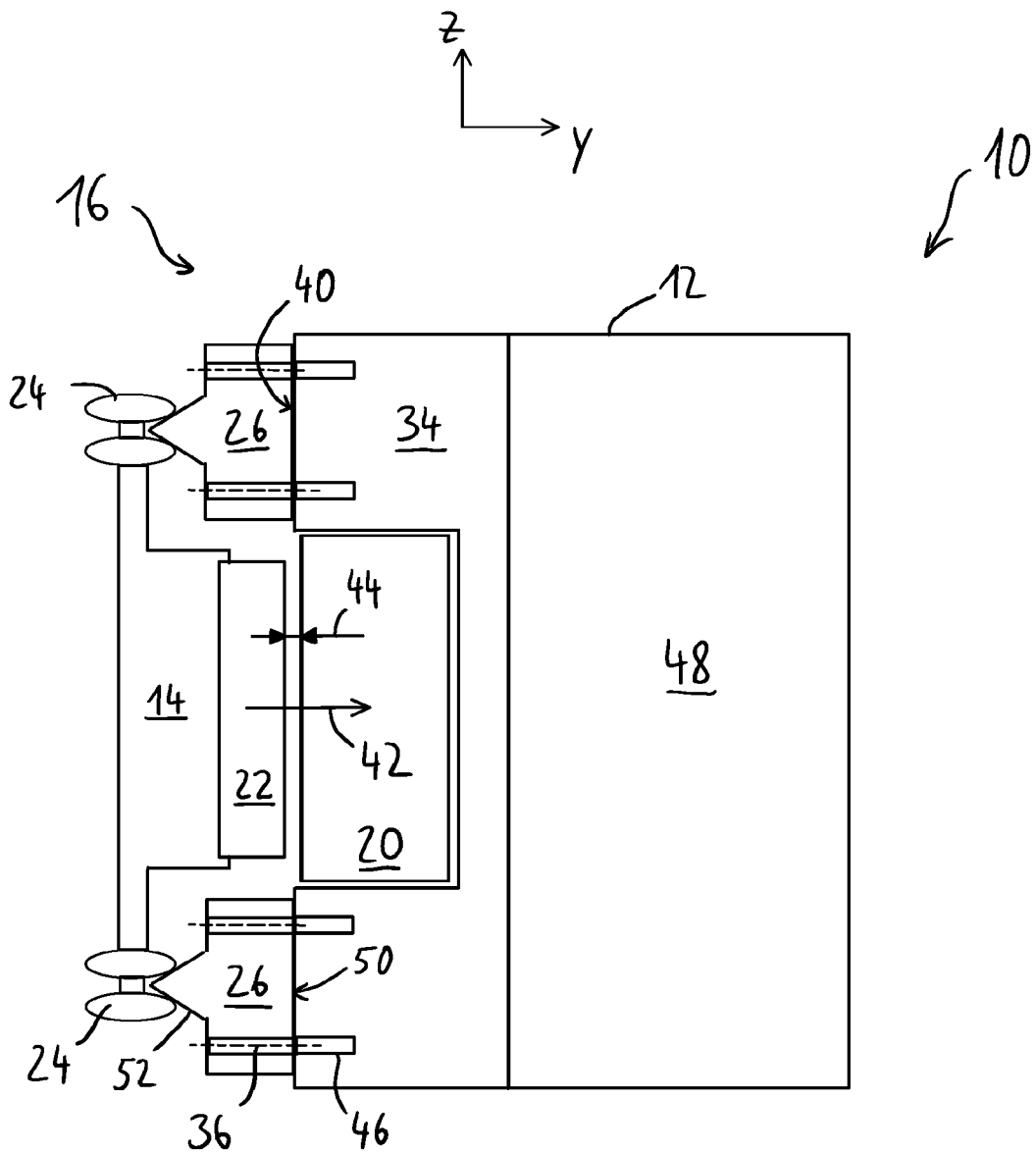
FIG. 4 shows a linear motor system in accordance with the invention in a sectional view.

In FIG. 4, a linear motor system 10 in accordance with the invention is shown that can preferably generally have a similar design to the linear motor system 10 of FIGS. 1 to 3. The linear motor system 10 of FIG. 4 comprises a segment 12 of a guide track 16 that is shown sectioned in FIG. 4, with the section plane extending in parallel with the yz plane.

A carrier 14 having a permanent or drive magnet 22 is visible. The segment 12 comprises an electromagnet 20. The electromagnet 20 causes an attractive force 42 on the drive magnet 22. A permanent magnet is integrated in the electromagnet 20 so that the carrier 14 is also held at the guide track 16 in a de-energized state of the electromagnet 20.

In the operation of the linear motor system 10, the electromagnet 20 is controlled to move the drive magnet 22 together with the carrier 14 in an x direction that extends perpendicular to the image plane in FIG. 4. For this purpose, the carrier 14 is guided at the guide track 16, namely by guide rails 26 that are provided at the guide track 16 and that cooperate with guide elements 24 of the carrier 14 for its guidance.

A respective guide track contacts a contact surface 40 of the guide track 16 or of the segment 12 and is fastened to the guide track 16 against this contact surface 40. The normal of the contact surface 40 extends at least substantially in parallel with the y direction.

The contact surface 40 causes an alignment of the guide rail 26 in the y direction without additional alignment means, for instance cylindrical pins. Rather, the guide rails 26 are so-to-say automatically aligned with respect to the y directions by a fastening in contact with the contact surface 40. This has the effect that the assembly of the guide rails 26 is simplified, wherein a predefined spacing 44 between the magnets 20 and 22 can, however, nevertheless be precisely observed.

A respective guide rail 26 is fastened to the guide track 16 by screws 36 that are here indicated only as a dashed line for the sake of clarity. A respective screw 36 engages into a fastening recess 46 that is provided in the contact surface 40 and that cooperates with an internal thread provided in the fastening recess 46 for fastening the guide rail 26. The screw 36 thus causes a fastening force that extends in parallel with the y direction.

The guide track 16 or the segment 12 comprises an element 34 to which the guide rails 26 and the electromagnet 20 are fastened. The element 34 therefore defines the position of the electromagnet 20 relative to the contact surface 40. In this embodiment, the element 34 is designed such that it surrounds the electromagnet 20 with respect to the z directions.

The guide track 16 or the segment 12 further comprises an electronics housing 48 in which, for example, power electronics for operating the electromagnet 20 can be provided. Further electronic components, for instance a sensor arrangement of a position detection system, can also be arranged in the electronics housing 48.

A respective guide rail 26 comprises a contact surface 50 with which the guide rail 26 contacts the contact surface 40 of the guide track 16 or of the element 34. The guide rail 26 furthermore comprises a guide surface 52 for bringing the guide element 24 of the carrier 14 in contact with the guide rail 26. In this embodiment, the contact surface 50 of the guide rail 26 and the guide surface 52 are connected in one piece with one another. Alternatively, they can, for example, also be formed by separate components that preferably comprise different materials.

As can, for instance, be seen from FIG. 4, the guide track 16 or the segment 12 is accessible in parallel with the z direction and the segment 12 can be removed from the series of segments 12 in parallel with the z direction after loosening the screws 36. On the removal, the segment 12 is preferably removed as a whole including the magnet 20, the element 34, and the electronics housing 48 in parallel with the z direction. The guide rails 26 leave free or do not bound the segment 12 or the element 34 in a direction in parallel with the z direction.

Figure 5:
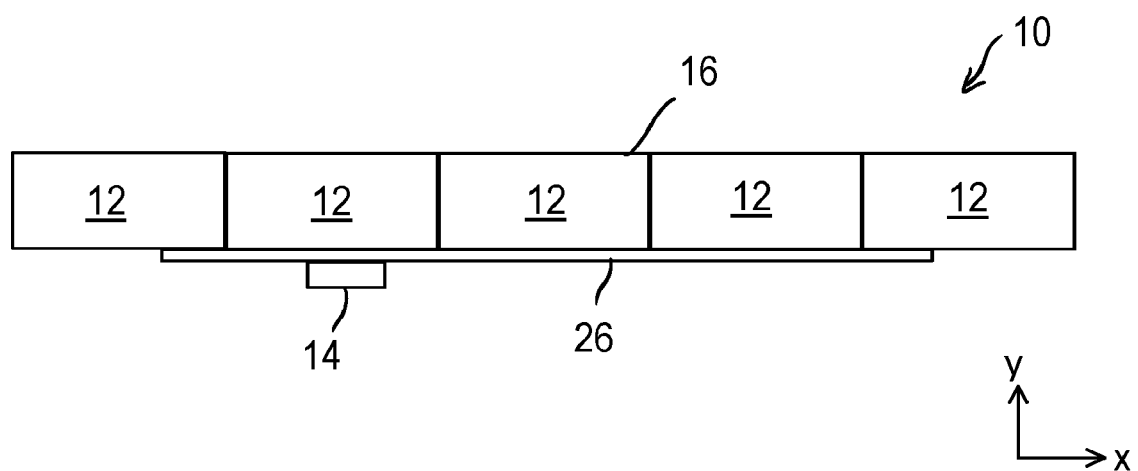
FIG. 5 shows the linear motor system of FIG. 4 in a plan view.

The linear motor system 10 of FIG. 4 is shown in a plan view in FIG. 5. The linear motor system 10 is only partly shown here, but can preferably be configured as a closed path, similarly to the illustration in FIG. 1.

Five segments 12 of the guide track 16 are shown in FIG. 5. A section of the guide track extends across a plurality of segments 12. A carrier 14 is further shown that is movable in a guided manner in parallel with the x direction. A z direction here extends perpendicular to the image plane.

If one of the segments 12 is to be removed from the guide track 16 in parallel with the z direction for the purpose of maintenance, the guide rail 26 can remain fastened to the remaining segments 12. Thus, neither a dismantling of the guide rail 26 nor a removal of the carrier 14 from the guide track 16 is necessary. Rather, only the screws 36 that connect the guide rail 26 to the segment 12 to be removed need to be loosened. The same applies accordingly to the insertion of a new or maintained segment 12. Thus, a segment 12 can be inserted at an empty position in parallel with the z direction and screws 36, which connect the guide rail 26 to the respective segment, can subsequently be attached. The design shown thus allows a particularly simple maintenance of the linear motor system 10.

In particular in the case of straight segments, it is generally also possible to remove or insert them in parallel with the y direction. Thus, with reference to FIG. 5, the segments 12 can be removed in the positive y direction or reinserted into the guide track 16 in the negative y direction without dismantling the guide rail 26. This likewise allows a simple maintenance.

REFERENCE NUMERAL LIST

10 transport system/linear motor system
12 segment
14 carrier
16 guide track
18 guide axis
20 electromagnet
22 drive magnet
24 guide element
26 guide rail
28 position detection device
30 position magnet
32 abutment edge
34 element
36 screw
38 recess
40 contact surface
42 attractive force
44 spacing
46 fastening recess
48 electronics housing
50 contact surface
52 guide surface

The invention claimed is:

1. A linear motor system, comprising:
a carrier,
a guide track for the carrier, the guide track including a plurality of segments,
a guide rail arranged at the guide track, and
a guide element arranged at the carrier,
wherein the guide rail and the guide element cooperate to guide the carrier at the guide track in a local guide direction,
wherein a first magnet is provided at the carrier and a second magnet is provided at the guide track for driving the carrier along the guide track and/or for holding the carrier at the guide track,
wherein the guide track comprises a contact surface at which the guide rail contacts the guide track, and a normal of the contact surface extends with at least one component in parallel with a y direction,
wherein, locally at each local point of each segment of the plurality of segments, (1) the y direction extends in parallel with a direction extending from the first magnet to the second magnet, (2) a z direction is defined perpendicular to the y direction, (3) an x direction extends perpendicular to the y direction and perpendicular to the z direction, and (4) the x direction corresponds to the local guide direction, along which the guide rail locally extends and along which the carrier is movable in a guided manner, or extending parallel therewith, and
wherein, when the guide rail is fastened, an element of the guide track to which the guide rail is fastened and/or a segment of the guide track is/are accessible and removable at least substantially in parallel with the z direction.

2. The linear motor system in accordance with claim 1, wherein a y component of the normal of the contact surface is greater than components of a normal in directions perpendicular to the y direction.

3. The linear motor system in accordance with claim 1, wherein the normal of the contact surface is at least substantially in parallel with the y direction.

4. The linear motor system in accordance with claim 1, wherein the guide rail is fastened against the contact surface.

5. The linear motor system in accordance with claim 1, wherein a fastening device for the guide rail exerts a fastening force with a component in the y direction.

6. The linear motor system in accordance with claim 1, wherein the guide rail is fastened to the guide track by means of a fastening element that is effective with a component in the y direction and/or that is inserted and/or engages with a component in the y direction into a fastening recess.

7. The linear motor system in accordance with claim 1, wherein the guide rail or a guide rail section extends over a plurality of segments.

8. The linear motor system in accordance with claim 1, wherein the guide rail leaves free and/or does not bound the component to which the guide rail is fastened in at least one direction in parallel with the z direction.

9. The linear motor system in accordance with claim 1, wherein the guide rail comprises a contact surface that contacts with the contact surface of the guide track and a guide surface that brings the guide element of the carrier in contact with the guide rail, and wherein the contact surface of the guide rail and the guide surface are connected in one piece with one another.

10. The linear motor system in accordance with claim 1, wherein the guide rail comprises a contact surface that contacts the contact surface of the guide track and a guide surface that brings the guide element of a carrier in contact with the guide rail, and wherein the contact surface of the guide rail and the guide surface are formed by separate components.

11. The linear motor system in accordance with claim 1, wherein the magnet of the carrier is attracted to the magnets of the guide track in a direction with a component in the y direction so that the carrier is held at the guide track.

12. A method of assembling, dismantling, or maintaining a linear motor system, the linear motor system including a carrier, a guide track for the carrier, the guide track including a plurality of segments, a guide rail arranged at the guide track, and a guide element arranged at the carrier, wherein the guide rail and the guide element cooperate to guide the carrier at the guide track in a local guide direction, wherein a first magnet is provided at the carrier and a second magnet is provided at the guide track for driving the carrier along the guide track and/or for holding the carrier at the guide track, and wherein the guide track comprises a contact surface at which the guide rail contacts the guide track, and a normal of the contact surface extends with at least one component in parallel with the y direction, wherein the method comprises:

releasing the guide rail from the guide track in a direction with a component in a y direction, and/or fastening the guide rail to the guide track in a fastening direction with a component in the y direction, wherein, locally at each local point of each segment of the plurality of segments, (1) the y direction extends in parallel with a direction extending from the first magnet to the second magnet, (2) a z direction is defined perpendicular to the y direction, (3) an x direction extends perpendicular to the y direction and perpendicular to the z direction, and (4) the x direction corresponds to the local guide direction, along which the guide rail locally extends and along which the carrier is movable in a guided manner, or extending parallel therewith, and wherein, when the guide rail is fastened, an element of the guide track to which the guide rail is fastened and/or a segment of the guide track is/are accessible and removable at least substantially in parallel with the z direction.

13. The method in accordance with claim 12, wherein the guide track comprises a plurality of segments, and wherein the method further comprises:

removing the segment in a direction extending at least substantially perpendicular to the y direction, and/or inserting the segment in a direction extending at least substantially perpendicular to the y direction.

14. The linear motor system of claim 1, wherein the guide rail is fastened to the guide track in a fastening direction, wherein the fastening direction is at least substantially in parallel with the y direction.

\* \* \* \* \*